United States Patent [19]
Asplin

[11] 3,723,884
[45] Mar. 27, 1973

[54] MODULAR FILTERS FOR TELEVISION RECEIVERS

[76] Inventor: William Asplin, 6162 Ridgewood Dr. S.W., Canton, Ohio 44706

[22] Filed: Jan. 5, 1971

[21] Appl. No.: 104,032

[52] U.S. Cl. ............325/477, 178/DIG. 13, 325/308, 325/355
[51] Int. Cl. ............H04b 1/10, H04n 7/18
[58] Field of Search .....178/5.8 A, DIG. 13; 325/477, 325/355, 308

[56] References Cited

UNITED STATES PATENTS

| | | | |
|---|---|---|---|
| 2,650,265 | 8/1953 | Mountjoy | 178/5.2 A |
| 2,901,533 | 8/1959 | Keizer | 178/5.2 A |

*Primary Examiner*—Howard W. Britton
*Attorney*—Wilson & Fraser

[57] ABSTRACT

A modular filter for separate attachment to receivers between the tuner and the intermediate frequency stages comprising a compact housing containing passive electronic components connected in circuit with input and output connectors to provide electromagnetic wave filtering at variably selected frequencies.

1 Claim, 4 Drawing Figures

Patented March 27, 1973 3,723,884

2 Sheets-Sheet 1

INVENTOR.
WILLIAM A. ASPLIN

BY

Wilson & Fraser

ATTORNEYS

Patented March 27, 1973 3,723,884

INVENTOR.
WILLIAM A. ASPLIN

BY
Wilson + Fraser
ATTORNEYS

MODULAR FILTERS FOR TELEVISION RECEIVERS

BACKGROUND OF THE INVENTION

The concept of utilizing transmission lines to distribute broadcast quality television signals directly to home viewers has been known for many years and is referred to as cable television or cable TV as contrasted with conventional or "free air" reception. There have been a large number of technical and economic problems encountered in the development of cable television and some remain yet unsolved. In order to be economically feasible cable television receivers must be compatible and interchangeable for use as free air receivers so that a prospective user of cable television will not be forced to acquire a separate television receiver for cable reception.

A large number of commercially available television receivers are not suitable for use in cable systems because of their poor selectivity which is the result of inadequate filtering of the television signal. Selectivity is the name given to the ability of a receiver to distinguish or select a particular signal from other signals nearby in the frequency spectrum. Good selectivity is an essential characteristic of receivers used in a cable system because adjacent channels are spaced closer than in the conventional broadcast spectrum.

SUMMARY OF THE INVENTION

Accordingly, it is the purpose of this invention to provide an attachment for conventional television receivers which will improve their selectivity characteristics and permit their use in cable systems. The attachment of the invention is a modular filter which may be inserted between the tuner and the intermediate frequency amplifier stages by a qualified repairman in the home of the set owner without removing the set to the shop. The filter is a passive device comprising band-pass or band-reject circuitry contained within a compact housing having input and output connections. The filter is connected into the circuitry by opening the signal path from the tuner to the intermediate frequency stages and inserting the filter in series. By using conventional connectors and connecting cables the filter may be removed or replaced as desired.

DESCRIPTION OF A PREFERRED EMBODIMENT

Figure 1:
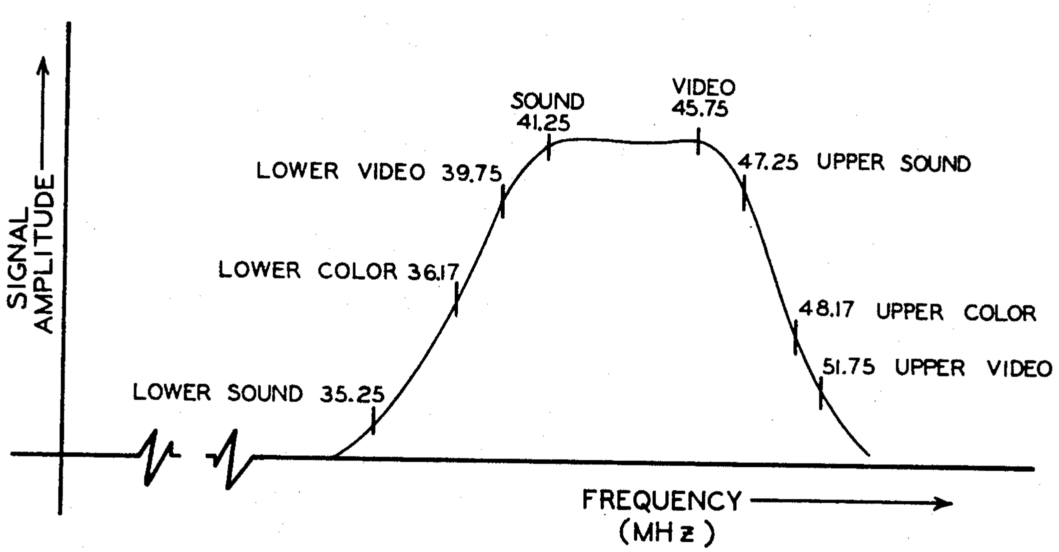
FIG. 1 is a graph of signal amplitude versus frequency for the tuner output of a conventional television receiver without additional filtering.

The invention will be understood more readily by referring to the drawing in connection with the following explanation. FIG. 1 is a graph of signal amplitude versus frequency for the tuner output on channel 3 of a typical television receiver. The desired sound and video carrier signals are shown as being of maximum amplitude while the upper and lower sound and video signals of adjacent channels are shown as attenuated in varying degrees by the filter arrangement of the receiver. In order to provide interference-free viewing all carriers except the desired sound and video carriers must be attenuated at the input to the intermediate frequency stages. The degree of attenuation required is on the order of 20 db for vacuum tube stages and 25 to 30 db for transistor stages.

The most troublesome of the carrier frequencies shown in FIG. 1 are 39.75 MHz, 47.25 MHz and 48.17 MHz. The rejection pattern exhibited by the degree of attenuation of these frequencies as shown is insufficient for proper reception when this receiver is to be used in a cable system. This rejection pattern is typical of many commercially available television receivers. If a set exhibiting these characteristics were to be used in a cable system an improved filtering arrangement would have to be provided to insure adequate reception.

Figure 2:
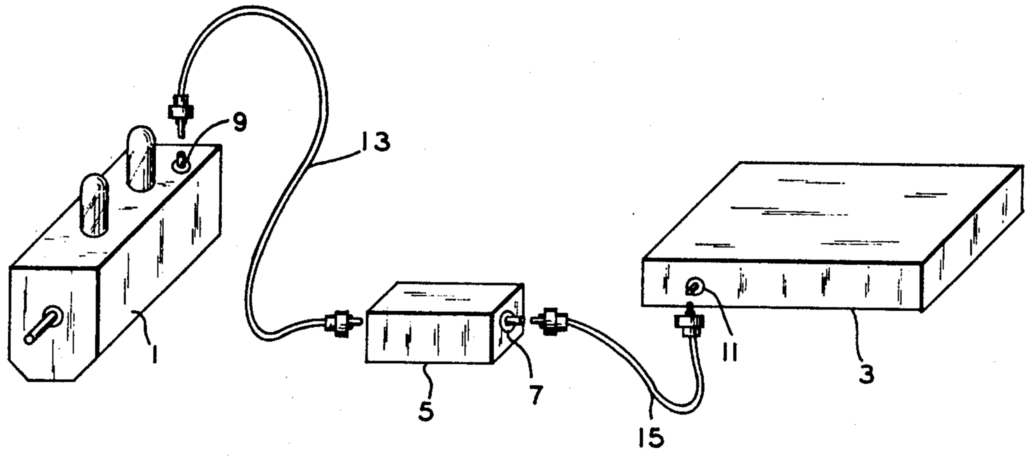
FIG. 2 is a perspective view showing the physical arrangement of components for the connection into the circuit of the filter of the present invention.

In accordance with the present invention a passive filter device in modular form is inserted between the tuner and the intermediate frequency amplifier stages of a television receiver to eliminate undesirable frequencies. FIG. 2 shows a conventional television tuner 1 which normally feeds a combined sound and picture signal to the intermediate frequency stages 3. The showing here is simplified for purposes of clarity, and those skilled in the art will appreciate that in actual practice the physical configurations may differ somewhat.

The filter device of the invention is shown at 5 and comprises a housing with input and output connectors mounted thereon. The output connector is shown at 7 and may be any suitable connector which provides adequate signal shielding. Tuner 1 is provided with an output connector 9, and the intermediate frequency stages 3 receive the input signal through input connector 11. The input connector on filter 5 is not shown in FIG. 2. The tuner 1, filter 3 and intermediate frequency stages 3 are connected together by suitable interconnecting cables 13 and 15 which are provided with connectors complimentary to the connectors 7, 9 and 11.

Figure 3:
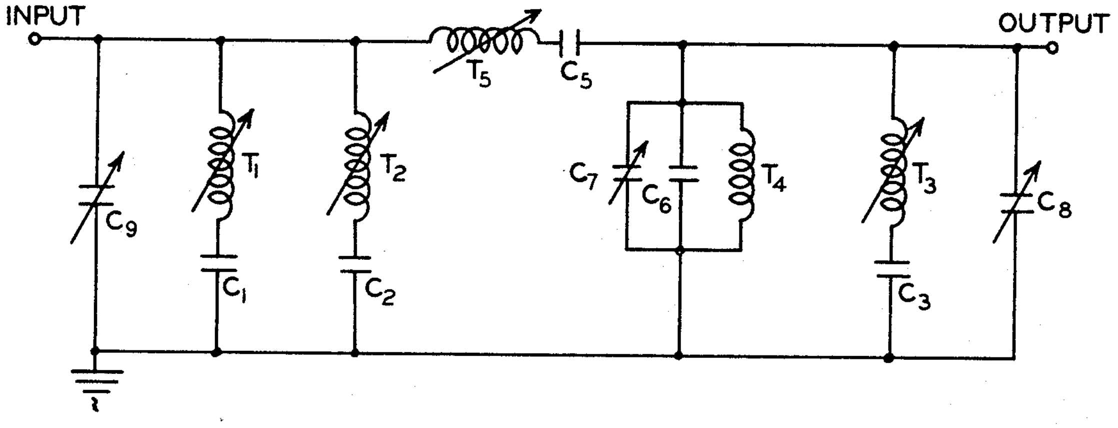
FIG. 3 is a schematic diagram of a filter circuit constructed in accordance with the present invention.

The electrical circuitry of filter 5 is shown schematically in FIG. 3. The component values for this circuit are as follows:

| | |
|---|---|
| $C_1$ = 5 μμfd. | $C_7$ = 8-50 μμfd. variable |
| $C_2$ = 8 μμfd. | $C_8$ =5-25 μμfd. variable |
| $C_3$ = 5 μμfd. | $C_9$ = 5-25 μμfd. variable |
| $C_4$ = 4.7 μμfd. | $T_1$, $T_2$, $T_3$, $T_5$ = 1.9 - 2.4 mh variable |
| $C_6$ = 91 μμfd. | $T_4$ = 0.01 mh |

Figure 4:
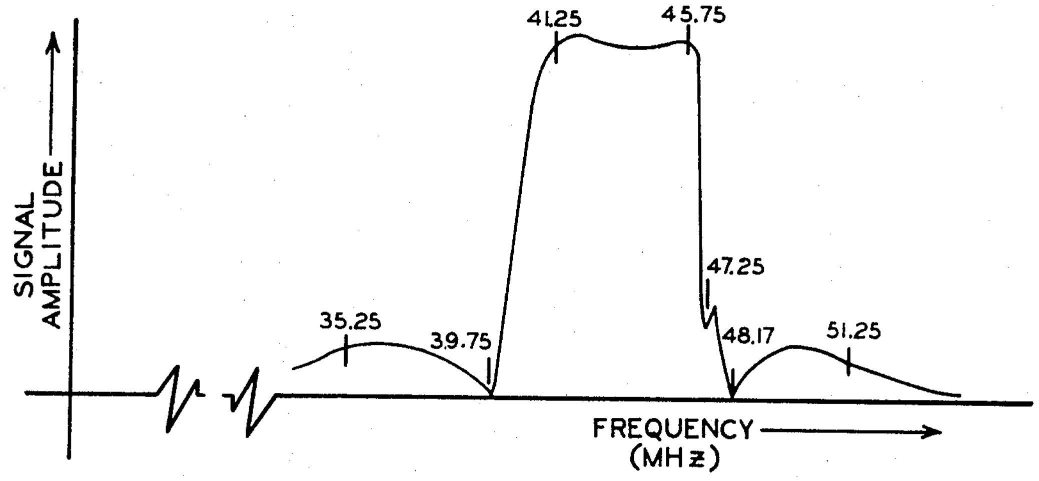
FIG. 4 is a graph of signal amplitude versus frequency for the output of the modular filter.

This circuit has an input and output impedance of 75 ohms with an insertion loss of 1.5 db. It provides a minimum attenuation of 18 db for unwanted frequencies. The operating characteristics can be appreciated from FIG. 4 which shows signal amplitude plotted against frequency. A comparison of FIG. 4 with FIG. 1 makes readily apparent the increase in selectivity obtained by introducing the filter 5 into the circuit.

In the circuit of FIG. 3 series resonant inductance $T_5$ and capacitance $C_5$ and parallel resonant inductance $T_4$ and capacitances $C_6$ and $C_7$ act as band pass elements and attenuate by at least 18 db all frequencies outside of the desired band which in this case is 41.25 MHz to 46.25 MHz. Series resonant traps formed by the inductance-capacitance combinations of $T_1$, and $C_1$, $T_2$ and $C_2$, and $T_3$ and $C_3$ enable concentrated attenuation at the specific frequencies of resonance.

What is claimed is:

1. A modular filter attachment for cable television for mounting in a conventional television receiver between the tuner and the intermediate frequency stages comprising
   a housing member,
   input and output connectors mounted on said housing member,
   a plurality of passive components, at least some of which are variable in value to permit resonant tuning, mounted within said housing and connected between said input and output connectors to provide a plurality of series resonant circuits and at least one parallel resonant circuit to produce electromagnetic wave filtering at desired frequencies,
   means for connecting the input connector to the output of said tuner, and
   means for connecting the output connector to the input of said intermediate frequency stages,
   whereby the conventional television receiver will have greatly improved selectivity and will be adaptable for use in cable television systems.

* * * * *